United States Patent
Nakamura et al.

(10) Patent No.: US 8,965,612 B2
(45) Date of Patent: Feb. 24, 2015

(54) FAILURE DETECTION DEVICE FOR VEHICLE

(75) Inventors: Makoto Nakamura, Okazaki (JP); Takaya Soma, Anjo (JP); Tomoko Shimana, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/530,512

(22) Filed: Jun. 22, 2012

(65) Prior Publication Data

US 2012/0330487 A1   Dec. 27, 2012

(30) Foreign Application Priority Data

Jun. 23, 2011  (JP) .................................. 2011-139448

(51) Int. Cl.
  *G06F 7/00*       (2006.01)
  *B60L 3/00*       (2006.01)
(52) U.S. Cl.
  CPC ............. *B60L 3/0038* (2013.01); *B60L 3/0061* (2013.01)
  USPC ............................................ 701/22; 123/435
(58) Field of Classification Search
  CPC ..... B60L 3/0038; B60L 3/0061; B60L 3/003; B60L 3/0069; G01R 31/006; B60K 6/445; B60W 10/30; B62D 5/0463; B62D 5/0466; B60R 21/0136
  USPC ........... 701/22, 82, 84, 45; 180/446; 318/148, 318/255, 376, 380, 490, 807, 225; 340/905, 340/500; 715/771; 477/3; 320/101; 123/435
  See application file for complete search history.

(56) References Cited

U.S. PATENT DOCUMENTS

| | | | | |
|---|---|---|---|---|
| 7,729,842 | B2 * | 6/2010 | Sugita | 701/84 |
| 2004/0051495 | A1 * | 3/2004 | Kaneko et al. | 318/807 |
| 2006/0250230 | A1 * | 11/2006 | Fischer et al. | 340/500 |
| 2007/0228822 | A1 * | 10/2007 | Hirata | 303/151 |
| 2007/0252543 | A1 * | 11/2007 | Rottmerhusen | 318/254 |
| 2008/0119990 | A1 * | 5/2008 | Fujimoto et al. | 701/45 |
| 2008/0258656 | A1 * | 10/2008 | Kawasaki et al. | 318/148 |
| 2009/0051365 | A1 * | 2/2009 | Bertness | 324/503 |
| 2009/0243523 | A1 * | 10/2009 | Tanaka et al. | 318/376 |
| 2009/0289594 | A1 * | 11/2009 | Sato | 320/101 |
| 2009/0308683 | A1 * | 12/2009 | Suzuki | 180/446 |
| 2010/0036555 | A1 * | 2/2010 | Hosoda et al. | 701/22 |
| 2010/0256887 | A1 * | 10/2010 | Linda et al. | 701/82 |
| 2010/0292046 | A1 * | 11/2010 | Kaltenbach | 477/3 |
| 2011/0166727 | A1 * | 7/2011 | Light et al. | 701/22 |
| 2011/0218698 | A1 * | 9/2011 | Bissontz | 701/22 |
| 2011/0260661 | A1 * | 10/2011 | Vilar | 318/380 |
| 2011/0265025 | A1 * | 10/2011 | Bertness | 715/771 |
| 2011/0303190 | A1 * | 12/2011 | Yasuda | 123/435 |
| 2012/0212353 | A1 * | 8/2012 | Fung et al. | 340/905 |
| 2012/0323428 | A1 * | 12/2012 | Bissontz | 701/22 |
| 2012/0330487 | A1 * | 12/2012 | Nakamura et al. | 701/22 |
| 2013/0033214 | A1 * | 2/2013 | Obata et al. | 318/490 |

FOREIGN PATENT DOCUMENTS

| | | |
|---|---|---|
| CN | 101622149 A | 1/2010 |
| JP | 09-172791 A | 6/1997 |

(Continued)

*Primary Examiner* — Tuan C. To
*Assistant Examiner* — Yuri Kan
(74) *Attorney, Agent, or Firm* — Sughrue Mion, PLLC

(57) ABSTRACT

A failure detection device for a vehicle that detects a failure of a motor system includes a controller that changes a sensitivity for detection of a failure in the motor system in accordance with at least one of an operational condition of the motor system and a situation in which the motor system is operating.

10 Claims, 2 Drawing Sheets

(56) References Cited

FOREIGN PATENT DOCUMENTS

| | | |
|---|---|---|
| JP | 11-280513 A | 10/1999 |
| JP | 2003-041995 A | 2/2003 |
| JP | 2003-329719 A | 11/2003 |
| JP | 2004-266937 A | 9/2004 |
| JP | 2007-331577 A | 12/2007 |
| JP | 2009-060358 A | 3/2009 |

* cited by examiner

FIG. 2

[OTHER THAN P RANGE (D OR R RANGE)]

| FAILURE TO BE DETECTED | CONDITION 1 | CONDITION 2 | VEHICLE STOP | LOW SPEED | MIDDLE SPEED | HIGH SPEED |
|---|---|---|---|---|---|---|
| TORQUE ABNORMALITY | SDOWN | | MODE 1 | MODE 1 | MODE 1 | MODE 1 |
| | NON-SDOWN | | MODE 2 | MODE 2 | MODE 2 | MODE 2 |
| FAILURE IN CURRENT SENSOR | SDOWN | | MODE 1 | MODE 1 | MODE 1 | MODE 1 |
| | NON-SDOWN | | MODE 2 | MODE 2 | MODE 3 | MODE 3 |
| FAILURE IN RESOLVER | SDOWN | | MODE 1 | MODE 1 | MODE 1 | MODE 1 |
| | NON-SDOWN | HAVING INTERPHASE SHORT-CIRCUIT | MODE 3 | MODE 3 | MODE 3 | MODE 3 |
| | | HAVING NO INTERPHASE SHORT-CIRCUIT | MODE 2 | MODE 2 | MODE 2 | MODE 2 |

[P RANGE (PARKING LOCK IS IN OPERATION)]

| FAILURE TO BE DETECTED | CONDITION 1 | CONDITION 2 | VEHICLE STOP | LOW SPEED | MIDDLE SPEED | HIGH SPEED |
|---|---|---|---|---|---|---|
| TORQUE ABNORMALITY | SDOWN | | MODE 1 | MODE 1 | MODE 1 | MODE 1 |
| | NON-SDOWN | | MODE 1 | MODE 1 | MODE 1 | MODE 1 |
| FAILURE IN CURRENT SENSOR | SDOWN | | MODE 1 | MODE 1 | MODE 1 | MODE 1 |
| | NON-SDOWN | | MODE 1 | MODE 1 | MODE 1 | MODE 1 |
| FAILURE IN RESOLVER | SDOWN | | MODE 1 | MODE 1 | MODE 1 | MODE 1 |
| | NON-SDOWN | HAVING INTERPHASE SHORT-CIRCUIT | | | | |
| | | HAVING NO INTERPHASE SHORT-CIRCUIT | MODE 1 | MODE 1 | MODE 1 | MODE 1 |

FAILURE DETECTION DEVICE FOR VEHICLE

INCORPORATION BY REFERENCE

The disclosure of Japanese Patent Application No. 2011-139448 filed on Jun. 23, 2011 including the specification, drawings and abstract is incorporated herein by reference in its entirety.

BACKGROUND OF THE INVENTION

1. Field of the Invention

The present invention relates to failure detection device for a vehicle that detects a failure in a motor system.

2. Description of Related Art

In recent years, electric vehicles and hybrid vehicles which use a motor as a driving source have been put into practice. Japanese Patent Application Publication No. 11-280513 (JP 11-280513 A) discloses a failure detection device for a hybrid vehicle that includes an engine, a power-generating motor and a driving motor. The failure detection device decreases the reference value that is used to determine whether to discharge the battery that supplies electric power to a motor system so that the vehicle can continue running on the motor when a failure in the engine is detected.

In such an electric vehicle or hybrid vehicle, the drive current, rotational angle or temperature of the motor is monitored and a failure in the motor system is detected based on a detected value. When the failure determination criteria are made strict to increase the failure detection sensitivity, a fail-safe function is frequently executed because a temporal deviation of the detected value that is negligible in a normal situation is immediately determined as a failure. On the other hand, when the failure determination criteria are relaxed to decrease the failure detection sensitivity, occurrence of a failure which requires execution of a fail-safe function tends to be neglected.

SUMMARY OF THE INVENTION

The present invention provides a failure detection device for a vehicle that detects a failure in a motor system more appropriately.

The level of a failure in a motor system, at which a problem is caused and execution of a fail-safe function is required, changes depending on the operational condition of the motor system and/or the situation in which the motor system is operating. In other words, a minor failure may require an immediate execution of a fail-safe function or no fail-safe function may be required unless the failure is serious, depending on the operational condition of the motor system and/or the situation in which the motor system is operating.

One aspect of the present invention relates to failure detection device for a vehicle that detects a failure in a motor system. The failure detection device includes a controller that changes a sensitivity for detection of a failure in the motor system in accordance with at least one of an operational condition of the motor system and a situation in which the motor system is operating. In other words, the failure determination criterion is changed in accordance with at least one of the operational condition of the motor system and the situation in which the motor system is operating. Thus, the failure detection sensitivity can be changed in accordance with the situation. For example, the failure detection sensitivity is increased in a situation where execution of a fail-safe function is required even if a minor failure occurs, and the detection sensitivity is decreased when execution of a fail-safe function is not required unless a serious failure occurs. Therefore, according to this aspect of the present invention, a failure in the motor system can be detected more appropriately.

Depending on the situation in which the motor system is operating, the motor system may be in the same operational condition as the operational condition in which the fail-safe function has been executed in response to detection of a failure in the motor system. For example, when the shift range is set to the neutral range, the inverter of the motor system is shut down because there is no need to drive the motor. Thus, in the case where the inverter of the motor system is shut down as a fail-safe function when a failure is detected, the operational condition of the motor system at a time when the shift range is set to the neutral range is the same as the operational condition in which a fail-safe function has been executed. In such a situation (that is, when the operational condition of the motor system is the same as the operational condition in which a fail-safe function has been executed), a failure in the motor system does not lead to a serious problem immediately. Thus, the controller may decrease the sensitivity for detection of a failure when the motor system is in the same operational condition as the operational condition in which a fail-safe function has been executed in response to detection of a failure in the motor system.

One typical failure in the motor system is a failure of a current sensor that detects the motor current. In the case where an AC current is used as the motor current, one typical failure in a current sensor is an offset failure. The offset failure is a failure in which the current sensor detects the center of variation of the motor current as a value deviated from a normal detected value.

If an offset failure occurs when the motor is operating in a high speed range, torque variation in the motor leads to large power fluctuations and the battery is affected significantly. On the other hand, when the motor is operating in a low speed range, an offset failure does not lead to large power fluctuations. Thus, when emphasis is placed on the influence on the battery, an offset failure in the current sensor is less acceptable when the motor is operating in a high speed range than when the motor is operating in a low speed range. The motor may vibrate due to an offset failure, and vibration caused by such an offset failure is relatively small when the motor is operating in a high speed range in which motor torque variation is large. Thus, when emphasis is placed on prevention of vibration caused by an offset failure, an offset failure in the current sensor is less acceptable when the motor is operating in a low speed range than when the motor is operating in a high speed range.

As described above, the rotational speed range in which an offset failure causes a serious problem depends where emphasis is placed, and the extent to which an offset failure is acceptable depends on the rotational speed of the motor. Thus, the controller may change a sensitivity for detection of an offset failure in a current sensor that detects a motor current, in accordance with a motor rotational speed.

A resolver is often used as a sensor that detects the rotational angle of a motor. In a resolver, a plurality of coils are attached to a motor rotating shaft. Its typical failure is interphase short-circuit, i.e., short-circuit between the coils. If an interphase short-circuit occurs at one location, the interphase short-circuit does not affect the operation of the motor system and therefore may not be regarded as a system failure. However, when another interphase short-circuit occurs at another location, a closed circuit is formed and the resolver becomes non-functional. Thus, an interphase short-circuit may increase the possibility of occurrence of a failure that requires execution of a fail-safe function. Thus, the controller may set a sensitivity for detection of a failure in a resolver that detects a motor rotational angle, to a higher level when the resolver has an interphase short-circuit than when the resolver has no interphase short-circuit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a table that shows the manner in which the failure detection sensitivity is set in the embodiment.

DETAILED DESCRIPTION OF EMBODIMENTS

Figure 1:
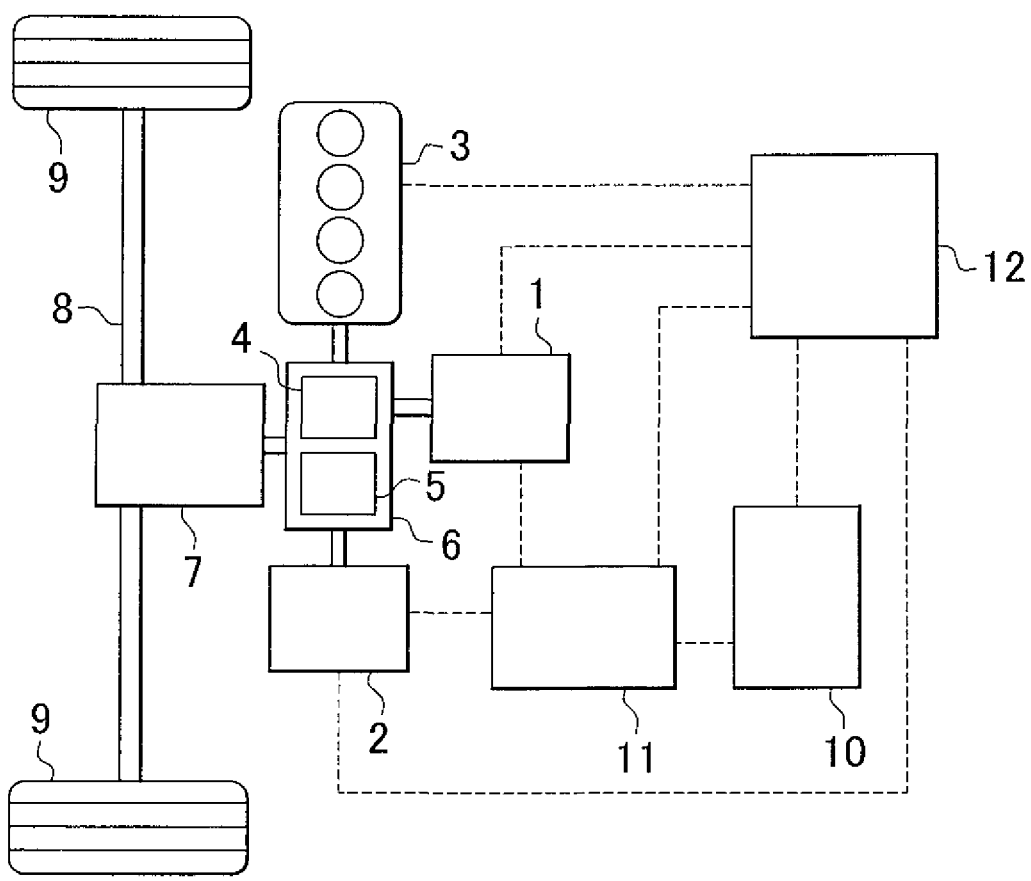
FIG. 1 is a simplified diagram that schematically illustrates the configuration of the drive system of a hybrid vehicle to which a failure detection device for a vehicle according to an embodiment of the present invention is applied.

A failure detection device for a vehicle according to an embodiment of the present invention will be described in detail with reference to FIG. 1 and FIG. 2. Referring to FIG. 1, the configuration of the drive system of a hybrid vehicle to which the failure detection device according to this embodiment is applied will be first described. As shown in FIG. 1, a first motor generator (first MG) 1, a second motor generator (second MG) 2 and an engine 3 are coupled to a power split mechanism 6 that includes two planetary gears, a power split planetary gear 4 and a reduction planetary gear 5. The power split mechanism 6 is coupled to an axle 8 of driving wheels 9 via a reduction gear 7. The first MG 1 and the second MG 2 are electrically connected to a battery 10 via an inverter 11.

In this hybrid vehicle, the first MG 1 is used primarily for power generation, and the second MG 2 is used primarily for driving the vehicle. Thus, in this embodiment, a power-generating motor system (i.e., a motor system for power generation) is constituted by the first MG 1, the inverter 11 and their peripheral components, and a driving motor system (a motor system for driving the vehicle) is constituted by the second MG 2, the inverter 11 and their peripheral components.

The engine 3, the first MG 1, the second MG 2, the battery 10 and the inverter 11 are controlled by a controller 12. The controller 12 is constituted by a main system and a plurality of subsystems, and each part of the hybrid vehicle is controlled by a subsystem for the part based on a command from the main system.

Each subsystem detects failure in the actuator that the subsystem controls, and upon detection of a failure, the subsystem informs the main system of the failure. In the power-generating motor system and the driving motor system, failure detection is carried out in the same manner as described above. For example, in the power-generating motor system and the driving motor system, failure detection is carried out in the manner as described below. In this hybrid vehicle, when a failure is detected in a motor system, the inverter 11 is shut down as a fail-safe function. Detection of torque abnormality: it is detected whether or not the torques that are output from the first MG 1 and the second MG 2 are within a normal range. Detection of failure of current sensor in motor system: it is detected whether or not the current sensor that detects the current flowing through the first MG 1 or the second MG 2 is in an offset failure state in which the current sensor detects the center of variation of the motor current as a value deviated from a normal detected value. Detection of failure in resolver in motor system: it is detected whether or not the resolver that detects the rotational phase of the first MG 1 or the second MG 2 is in an abnormal state.

In this embodiment, the main system sets the level of detection of a failure in the motor system as described above in accordance with the operational condition of the motor system and the situation in which the motor system is operating (in other words, the situation around the motor system, that is, the condition of a parking lock in this embodiment), and sends a command to each subsystem. Upon reception of the command, the subsystem changes the failure detection sensitivity based on the command and carry out failure detection.

The failure detection sensitivity is changed by changing a failure determination criterion. The failure detection sensitivity is changed in the following manner, for example. When it is determined that there is a failure if a value that is monitored for failure detection is continuously equal to or greater than a prescribed failure determination value for a prescribed failure determination period or longer, the failure detection sensitivity can be increased by decreasing the failure determination value or the failure determination period. As described above, each subsystem changes the failure detection sensitivity by changing the failure determination value or failure determination period.

The manner in which the failure detection level is set in this embodiment is described in detail below. In this embodiment, the main system sets the failure detection level to a plurality of sensitivities in the manner as shown in FIG. 2. Here, the failure detection level is changed among three levels from mode 1 to mode 3. The higher the value of the mode becomes, the higher the failure detection sensitivity becomes.

First, as shown in FIG. 2, the main system sets the failure detection sensitivity to a lower level when a shift range is set to the parking range (P range), in which the parking lock is in operation, than when the shift range is set to other ranges, such as a drive range (D range) or a reverse range (R range). Specifically, the failure detection level is set to mode 1 irrespective of conditions or type of failure when the parking lock is in operation (when the shift range is set to the P range). In contrast, the failure detection level is set to mode 2 or mode 3 when the parking lock is not in operation (when the shift range is set to the D range or R range) unless the inverter 11 is in a shutdown state, which is described later.

In this embodiment, the failure detection level is set in the following manner when the parking lock is not in operation (when the shift range is set to the D range or R range). First, in this embodiment, when the parking lock is not in operation, the main system sets the sensitivity for detection of a failure in the motor system to a lower level when the inverter 11 is in the shutdown state than when the inverter 11 is not in the shutdown state. The inverter 11 is shut down as a fail-safe function when a failure is detected as described above. In addition, the inverter 11 is shut down when the shift range is set to the neutral range because there is no need to drive the motor system. Specifically, when the inverter 11 is in the shutdown state (indicated as "SDOWN" in FIG. 2), the failure detection level is set to mode 1 irrespective of conditions or type of failure. In contrast, when the inverter 11 is not in the shutdown state (indicated as "NON-SDOWN" in FIG. 2), the failure detection level is set to mode 2 or mode 3.

In this embodiment, when the parking lock is not in operation and when the inverter 11 is not in the shutdown state, the failure detection sensitivity is set in the following manner. In this embodiment, when the parking lock is not in operation and when the inverter 11 is not in the shutdown state, the main system sets the sensitivity for detection of an offset failure in the current sensor to a higher level when the vehicle is traveling at a middle or high speed, i.e., when the first MG 1 and/or the second MG 2 is/are operating at a high rotational speed, than when the vehicle is in a stopped state or the vehicle travels at a low speed, i.e., when the first MG 1 and the second MG 2 are operating at a low rotational speed. Specifically, the detection level for an offset failure in the current sensor is set to mode 3 when the vehicle is traveling at a middle or high speed, and the detection level for an offset failure in the current sensor is set to mode 2 when the vehicle is in the stopped state or the vehicle is traveling at a low speed.

In this embodiment, when the parking lock is not in operation and when the inverter 11 is not in the shutdown state, the main system sets the sensitivity for detection of a failure in the resolver to a higher level when an interphase short-circuit has been detected in the resolver than when an interphase short-circuit has not been detected. Specifically, the detection level for a resolver failure is set to mode 3 when the resolver has an interphase short-circuit, and the resolver failure detection level is set to mode 2 when the resolver does not have an interphase short-circuit.

The advantageous effect of this embodiment, which has the above-described configuration, will be next described. First, in this embodiment, the failure detection sensitivity is set to a lower level when the parking lock is in operation than when the parking lock is not in operation. When the parking lock is in operation, the vehicle can be maintained in the stopped state even if the first MG 1 or the second MG 2 produces a small amount of torque. Thus, when the parking lock is in operation, production of a small amount of motor torque is permissible and the sensitivity for detection of a failure in the motor system may be decreased.

In this embodiment, the sensitivity for detection of a failure in the motor system is set to a lower level when the inverter 11 is in the shutdown state (SDOWN) than when the inverter 11 is not in the shutdown state (NON-SDOWN). The inverter 11 is shut down when the shift range is set to the neutral range. The inverter 11 is also shut down as a fail-safe function upon detection of a failure. Thus, when the shift range is set to the neutral range, the motor system is in the same operational condition as the operational condition in which a fail-safe function has been executed. In such a situation, a failure in the motor system does not lead to a serious problem immediately. Thus, the sensitivity for detection of a failure in the motor system may be decreased.

In this embodiment, the sensitivity for detection of an offset failure in the current sensor(s) is set to a higher level when the first MG 1 and/or the second MG 2 is/are operating at a high rotational speed than when the first MG 1 and the second MG 2 are not operating at a high rotational speed. When an offset failure occurs in the current sensor when the first MG 1 or the second MG 2 is operating in a high speed range, torque variation in the first MG 1 or the second MG 2 leads to large power fluctuations and the battery 10 is affected significantly. On the other hand, when the first MG 1 and the second MG 2 are operating in a low speed range, an offset failure in the current sensor does not lead to large power fluctuations. Thus, when emphasis is placed on the influence on the battery, an offset failure in the current sensor is less acceptable when the motor is operating in high speed range than when the motor is operating in a low speed range.

In addition, in this embodiment, the sensitivity for detection of a failure in the resolver is set to a higher level when the resolver has an interphase short-circuit than when the resolver does not have an interphase short-circuit. In a resolver, a plurality of coils are attached to a motor rotating shaft, and its typical failure is interphase short-circuit, i.e., short-circuit between the coils. If an interphase short-circuit occurs at only one location, the interphase short-circuit does not affect the operation of the motor system and therefore may not be regarded as a system failure. However, when another interphase short-circuit occurs at another location, a closed circuit is formed and the resolver becomes non-functional. Thus, an interphase short-circuit that occurs at one location may increase the possibility of a system failure occurring.

The failure detection device for a vehicle according to this embodiment has the following advantageous effects. (1) In this embodiment, the sensitivity for detection of a failure in the motor system is changed in accordance with the operational condition of the motor system and the situation in which the motor system is operating. In other words, the failure determination criteria are changed in accordance with the operational condition of the motor system and the situation in which the motor system is operating. Thus, the failure detection sensitivity can be increased in a situation in which execution of a fail-safe function is required even if a minor failure occurs, and the detection sensitivity can be decreased when execution of a fail-safe function is not required unless a serious failure occurs. As a result, a failure in the motor system can be detected more appropriately.

(2) In this embodiment, the sensitivity for detection of a failure in the motor systems is decreased when the motor system is in the same operational condition as the operational condition in which a fail-safe function has been executed in response to detection of a failure in the motor system, in other words, when the inverter 11 is in the shutdown state. Thus, the failure detection sensitivity can be decreased when a failure does not lead to a problem immediately, and a failure can be detected appropriately in accordance with a situation.

(3) In this embodiment, the sensitivity for detection of an offset failure in the current sensor that detects the drive current of the motor is changed in accordance with the rotational speed of the motor. Specifically, the sensitivity for detection of an offset failure in the current sensor is set to a higher level when the rotational speed of the motor is high than when the rotational speed of the motor is low. Thus, a failure can be detected at high sensitivity when an offset failure in the current sensor has a significant influence on the battery or the like, and a failure can be detected appropriately in accordance with a situation.

(4) In this embodiment, the sensitivity for detection of a failure in the resolver is increased when an interphase short-circuit has been detected in the resolver. Thus, a failure can be detected at high sensitivity when an interphase short-circuit has occurred in the resolver and the possibility of a failure occurring has increased, and a failure can be detected appropriately in accordance with a situation.

(5) In this embodiment, the failure detection sensitivity is changed according to whether or not the parking lock is in operation. Specifically, the failure detection sensitivity is set to a lower level when the parking lock is in operation than when the parking lock is not in operation. Thus, the failure detection sensitivity can be decreased in a situation where production of a small amount of torque by the first MG 1 or the second MG 2 does not lead to a problem, and a failure can be detected appropriately in accordance with a situation.

The above embodiment may be modified as described below. While three failure detection levels are set and the failure detection sensitivity are changed among three modes in the above embodiment, the number of the detection levels is not limited to three, and may be changed as needed.

The inverter 11 is shut down as a fail-safe function when a failure is detected in the above embodiment. Even in the case where a fail-safe function is executed in a different manner upon detection of a failure, if a failure is detected when the motor system is in the same operational condition as the operational condition in which the fail-safe function has been executed, the current operational condition is maintained. Thus, the failure detection sensitivity may be decreased irrespective of the manner of a fail-safe function when the motor system is in the same operational condition as the operational condition in which a fail-safe function has been executed. With this configuration, the failure detection sensitivity can be decreased in a situation in which a failure would not lead to a problem immediately, and a failure can be detected appropriately in accordance with a situation.

While the failure detection sensitivity is changed according to whether the rotational speed of a motor that is determined based on the vehicle speed is high or low in the above embodiment, the failure detection sensitivity may be changed in accordance with the rotational speed of the motor measured.

In the above embodiment, the sensitivity for detection of an offset failure in the current sensor is set to a higher level when the rotational speed of the motor is high than when the rotational speed of the motor is low. The motor may vibrate due to an offset failure in the current sensor, but vibration that is caused by such an offset failure is relatively small when the motor is operating in a high speed range in which motor torque variation is large. Thus, when emphasis is placed on prevention of vibration caused by an offset failure, an offset failure in the current sensor is less acceptable when the motor is operating in a low speed range than when the motor is operating in a high speed range. Therefore, when emphasis is placed on prevention of vibration caused by an offset failure, the sensitivity for detection of an offset failure in the current sensor may be set to a higher level as the rotational speed of the motor becomes lower.

In this embodiment, the failure detection sensitivity is set to a lower level when the parking lock is in operation than when the parking lock is not in operation. If it is considered necessary to ensure that the vehicle is maintained in the stopped state when the parking lock is in operation, the production of a torque by the driving motor is not permissible. Thus, in this case, the sensitivity for detection of a failure in the motor system needs to be increased when the parking lock is in operation. Thus, when emphasis is placed on maintaining the vehicle in the stopped state when the parking lock is in operation, the failure detection sensitivity may be set to a higher level when the parking lock is in operation than when the parking lock is not in operation.

The failure detection sensitivity is changed in the manners as described in (i) to (iv) below in the above embodiment, at least one of them may be omitted. (i) The sensitivity for detection of a failure in the motor system is decreased when the motor system is in the same operational condition as the operational condition in which a fail-safe function has been executed in response to detection of a failure in the motor system. (ii) The sensitivity for detection of an offset failure in the current sensor that detects the drive current of the motor is changed in accordance with the rotational speed of the motor. (iii) The sensitivity for detection of a failure in the resolver is increased when the resolver has an interphase short-circuit. (iv) The failure detection sensitivity is changed according to whether or not the parking lock is in operation.

The level of a failure in the motor system, at which a problem is caused and execution of a fail-safe function is required, may change in a certain operational condition of the motor system or in a certain operating situation, in addition to the situations in which the failure detection sensitivity is changed as described in (i) to (iv) above. In this case, the failure detection sensitivity may be changed when the motor system is in the certain operational condition or the certain operating situation. With this configuration, a failure in the motor system can be detected more appropriately.

The technical idea that can be understood from the above embodiment and its modifications will be described in more detail in connection with the configuration in which the failure detection sensitivity is changed according to whether or not the parking lock is in operation, and the advantageous effects of the configuration.

When the parking lock is in operation, the vehicle can be maintained in the stopped state even if a small amount of motor torque is produced. If this is taken into account, the production of a small amount of torque by the driving motor is permissible when the parking lock is in operation, and the sensitivity for detection of a failure in the motor system may be decreased when the parking lock is in operation. In contrast, if it is considered necessary to ensure that the vehicle is maintained in the stopped state when the parking lock is in operation, the production of a torque by the driving motor is not permissible. Thus, in this case, the sensitivity for detection of a failure in the motor system needs to be increased when the parking lock is in operation. As described above, the required failure detection sensitivity depends on whether or not the parking lock is in operation. Thus, the sensitivity for detection of a failure in the motor system may be changed according to whether or not the parking lock is in operation.

What is claimed is:

1. A failure detection device for a vehicle that detects a failure of a motor system, comprising:
   a controller that changes a sensitivity for detection of a failure in the motor system, to one of a plurality of predetermined sensitivity levels, in accordance with (1) an operational condition of the motor system and (2) a situation in which the motor system is operating,
   wherein the controller determines the operational condition of the motor system and determines the situation in which the motor system is operating,
   the controller sends a command to at least one of a plurality of subsystems of the vehicle that are under control of the controller, depending on the determined operational condition of the motor system and the situation in which the motor is operating,
   upon reception of the command from the controller, the at least one of the plurality of subsystems of the vehicle changes the sensitivity for detection of a failure in the motor system,
   wherein the controller sets the sensitivity for detection of a failure to a lower level, from among the plurality of predetermined sensitivity levels, when a shift range is set to a parking range, than when the shift range is set to an other range.

2. The failure detection device according to claim 1, wherein if the parking lock is not in operation, then the controller decreases the sensitivity for detection of a failure when the motor system is in the same operational condition as an operational condition in which a fail-safe function has been executed in response to detection of a failure in the motor system, as compared to when the motor system is not in the same operation condition as the operation condition in which the fail-safe function has been executed.

3. The failure detection device according to claim 2, wherein the operational condition in which the fail-safe function has been executed is an operational condition in which an inverter included in the motor system is in a shutdown state.

4. The failure detection device according to claim 1, wherein the controller changes a sensitivity for detection of an offset failure in a current sensor that detects a motor current, in accordance with a motor rotational speed.

5. The failure detection device according to claim 1, wherein the controller sets a sensitivity for detection of a failure in a resolver that detects a motor rotational angle, to a higher level when the resolver has an interphase short-circuit than when the resolver has no interphase short-circuit.

6. The failure detection device according to claim 1, wherein the controller changes the sensitivity for detection of a failure by changing a failure determination criterion.

7. A failure detection device for a vehicle that detects a failure of a motor system, comprising:
  a controller configured to:
    determine an operational condition of the motor system and a situation in which the motor system is operating;
    set a sensitivity level for detection of a failure in the motor system, to one of a plurality of predetermined sensitivity levels, in accordance with the determined operational condition of the motor system and the determined situation in which the motor system is operating;
    send a command, which includes the sensitivity level, to at least one of a plurality of subsystems of the vehicle that are under control of the controller, depending on the determined operational condition of the motor system and the situation in which the motor is operating;
  wherein the at least one the plurality of subsystems of the vehicle changes the sensitivity, for detection of a failure in the motor system upon reception of the command from the controller
  wherein the sensitivity level for detection of a failure in the motor system is a lower level, among the plurality of predetermined sensitivity levels, when a shift range is set to a parking range, than when the shift range is set to an other range.

8. The failure detection device according to claim 7, wherein the plurality of subsystems of the vehicle include a first motor generator, a second motor generator and an engine coupled to a power split mechanism that includes two planetary gears, a power split planetary gear and a reduction planetary gear, and wherein the plurality of subsystems of the vehicle are each configured to detect failure in an actuator that the subsystem controls, and upon detection of a failure, the subsystem informs a main system of the controller of the failure.

9. The failure detection system according to claim 7, wherein the failure detection sensitivity is changed by changing a failure determination criterion,
  wherein the failure determination criterion includes at least one of a predetermined failure determination value or a predetermined failure determination period.

10. A failure detection device for a vehicle configured to detect a failure of a motor system, wherein the vehicle includes a power-generating motor system and a driving motor system, the failure detection device comprising:
  a controller configured to:
    determine an operational condition of the motor system and a situation in which the motor system is operating;
    set a sensitivity level for detection of a failure in the motor system, to one of a plurality of predetermined sensitivity levels, in accordance with the determined operational condition of the motor system and the determined situation in which the motor system is operating;
    send a command, which includes the sensitivity level, to at least one of a plurality of subsystems of the vehicle that are under control of the controller, depending on the determined operational condition of the motor system and the situation in which the motor is operating;
  wherein the at least one of the plurality of subsystems of the vehicle changes the sensitivity for detection of a failure in the motor system upon reception of the command from the controller,
  wherein when a shift range moves from a non-parking range to a parking range, the controller sets the sensitivity level for detection of a failure in the motor system to a first mode,
  wherein when the shift range moves from the parking range to the non-parking range, the controller sets the sensitivity level for detection of a failure in the motor system to a second mode or a third mode,
  wherein the first mode has a lower sensitivity level than the second mode and the third mode.

* * * * *